United States Patent
Yamaura et al.

(10) Patent No.: US 10,478,903 B2
(45) Date of Patent: Nov. 19, 2019

(54) METHOD FOR MANUFACTURING METAL PLATE

(71) Applicant: TOYOTA BOSHOKU KABUSHIKI KAISHA, Aichi (JP)

(72) Inventors: Kunihiro Yamaura, Tokai (JP); Hiroshi Morita, Imizu (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 90 days.

(21) Appl. No.: 15/955,926

(22) Filed: Apr. 18, 2018

(65) Prior Publication Data

US 2018/0311747 A1    Nov. 1, 2018

(30) Foreign Application Priority Data

Apr. 26, 2017    (JP) ................................. 2017-087289

(51) Int. Cl.
| | |
|---|---|
| *B23B 31/02* | (2006.01) |
| *B23C 5/08* | (2006.01) |
| *B25B 5/00* | (2006.01) |
| *B23Q 3/06* | (2006.01) |
| *B23B 31/107* | (2006.01) |

(Continued)

(52) U.S. Cl.
CPC ........ *B23B 31/021* (2013.01); *B23B 31/1074* (2013.01); *B23C 5/06* (2013.01); *B23C 5/08* (2013.01); *B23Q 3/064* (2013.01); *B23Q 3/069* (2013.01); *B25B 5/006* (2013.01); *B23Q 1/0072* (2013.01); *B23Q 2230/008* (2013.01); *B23Q 2703/02* (2013.01); *Y10T 29/4998* (2015.01); *Y10T 29/49995* (2015.01); *Y10T 29/49996* (2015.01)

(58) Field of Classification Search
CPC ..... B23B 31/021; B23B 31/1074; B23C 5/06; B23C 5/08; B23Q 3/062; B23Q 3/064; B23Q 3/069; B23Q 2230/008; B23Q 2703/02; B25B 5/006; Y10T 29/49995; Y10T 29/49996; Y10T 29/4998
USPC .......................... 269/309, 310, 289 R, 302.1
See application file for complete search history.

(56) References Cited

U.S. PATENT DOCUMENTS

| | | | | |
|---|---|---|---|---|
| 6,703,155 | B2 * | 3/2004 | Scartozzi | H01M 8/0228 429/437 |
| 2009/0233139 | A1 * | 9/2009 | Suzuki | H01M 8/04067 429/434 |
| 2010/0252973 | A1 * | 10/2010 | Reith | B21D 39/021 269/37 |

FOREIGN PATENT DOCUMENTS

| | | |
|---|---|---|
| JP | 10-202456 | 8/1998 |
| JP | 2010179390 A * | 8/2010 |

\* cited by examiner

*Primary Examiner* — Jermie E Cozart
(74) *Attorney, Agent, or Firm* — Greenblum & Bernstein, P.L.C.

(57) ABSTRACT

A metal plate includes a machining subject surface. The metal plate includes a first holding portion designed to be held by a chuck and a second holding portion located at a position separated from the first holding portion and designed to be held by the chuck. The method for manufacturing the metal plate includes performing reference surface machining that machines a surface of the second holding portion that is to be held by the chuck into a predetermined shape in a state in which the first holding portion is held by the chuck. The method includes releasing the first holding portion from the chuck and holding the second holding portion with the chuck. The method also (Continued)

includes machining the machining subject surface in a state in which the second holding portion is held by the chuck.

3 Claims, 4 Drawing Sheets

(51) Int. Cl.
*B23C 5/06* (2006.01)
*B23Q 1/00* (2006.01)

METHOD FOR MANUFACTURING METAL PLATE

BACKGROUND OF THE INVENTION

The present invention relates to a method for manufacturing a metal plate.

Japanese Laid-Open Patent Publication No. 10-202456 describes a known method for manufacturing a metal plate. In the method, in a state in which the metal plate is held by chucks in a thickness-wise direction, machining is performed on a machining subject surface in at least one of a front surface and a rear surface of the metal plate in the thickness-wise direction.

SUMMARY OF THE INVENTION

Portions of the metal plate held by the chucks may not be accurately shaped as required. Thus, machining of the machining subject surface of the metal plate in a state in which such portions are held by the chucks may lower the machining accuracy of the machining subject surface. Accordingly, it is difficult to accurately machine the machining subject surface of the metal plate.

It is an object of the present invention to provide a method for manufacturing a metal plate that accurately machines a machining subject surface of a metal plate.

The means for solving the above problem and the advantage of the present invention will now be described.

In a method for manufacturing a metal plate that solves the above problem, the metal plate includes a machining subject surface in at least one of a front surface and a rear surface of the metal plate in a thickness-wise direction. The machining subject surface is machined in a state in which the metal plate is held by a chuck in the thickness-wise direction. The metal plate includes a first holding portion designed to be held by the chuck in the thickness-wise direction and a second holding portion located at a position separated from the first holding portion and designed to be held by the chuck in the thickness-wise direction. The method includes performing reference surface machining that machines a surface of the second holding portion that is to be held by the chuck into a predetermined shape in a state in which the first holding portion is held by the chuck. The method also includes, after performing the reference surface machining, releasing the first holding portion from the chuck and holding the second holding portion with the chuck. The method also includes machining the machining subject surface of the metal plate in a state in which the second holding portion is held by the chuck.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of a method for manufacturing an end plate, which is a metal plate, will now be described with reference to FIGS. 1 to 5.

Figure 1:
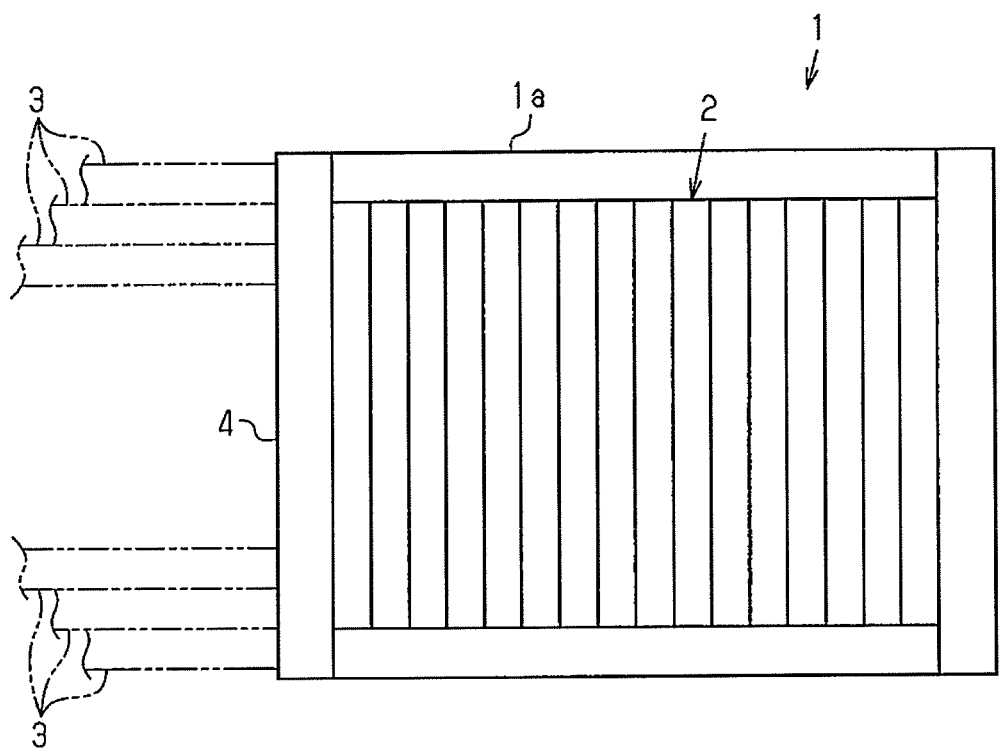
FIG. 1 is a diagram showing how an end plate is coupled to a cell stack of a fuel cell.

As shown in FIG. 1, an end plate 4, which is a metal plate, is arranged on an end of a cell stack 2 of a fuel cell 1 in a cell stacking direction (sideward direction in FIG. 1). The end plate 4 functions to supply fluid such as hydrogen (fuel gas), air (oxidation gas), and coolant (cooling liquid) to the cell stack 2. A plurality of pipes 3, through which the fluid flows, are connected to the end plate 4. The end plate 4 is coupled to a case 1a of the fuel cell 1. The case 1a surrounds the cell stack 2. The cell stack 2 generates power using the hydrogen and air supplied and discharged through the end plate 4 and cools using the coolant supplied and discharged through the end plate 4.

Figure 2:
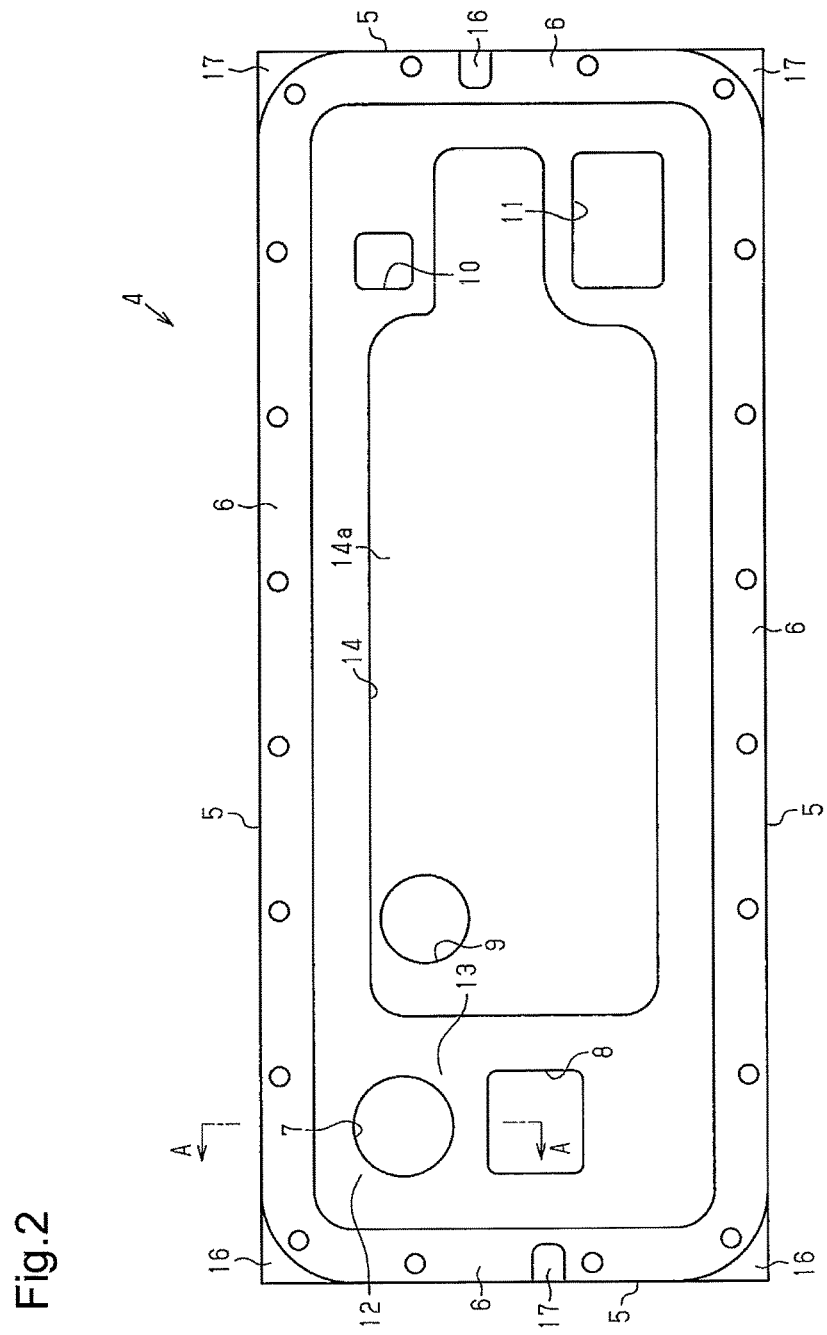
FIG. 2 is a plan view schematically showing the end plate of FIG. 1 as viewed from a cell stack side.

As shown in FIG. 2, the end plate 4 is rectangular and has a pair of long sides, namely, a first long side and a second long side, and a pair of short sides, namely, a first short side and a second short side. A peripheral part of the end plate 4 includes a fastening portion 5 extending along the first long side, the second long side, the first short side, and the second short side of the end plate 4. The fastening portion 5 is fastened to the case 1a (FIG. 1) by, for example, bolts. The fastening portion 5 includes a surface opposing the cell stack 2 (upper surface as viewed in FIG. 2) that defines a coupling surface 6 fixed in contact with the case 1a.

Holes 7 to 11 extending through the end plate 4 in a thickness-wise direction (direction that is orthogonal to the plane of FIG. 2) are formed in the part of the end plate 4 surrounded by the fastening portion 5. The holes 7 to 11 form passages for the fluids described above. The holes 7, 8, 10, and 11 open in an opposing surface 12 of the end plate 4 opposing an end in the cell stacking direction of the cell stack 2. Further, a recess 14 extending in a long side direction of the end plate 4 opens in the opposing surface 12. The recess 14 includes a bottom surface 14a where the hole 9 opens at a position located at one end of the recess 14 in the long side direction. The hole 9 and the recess 14 form a passage through which the fluid flows. A resin layer 13 is formed on the end plate 4 so as to cover the opposing surface 12, a wall surface of the recess 14, and wall surfaces of the holes 7 to 11.

Figure 3:
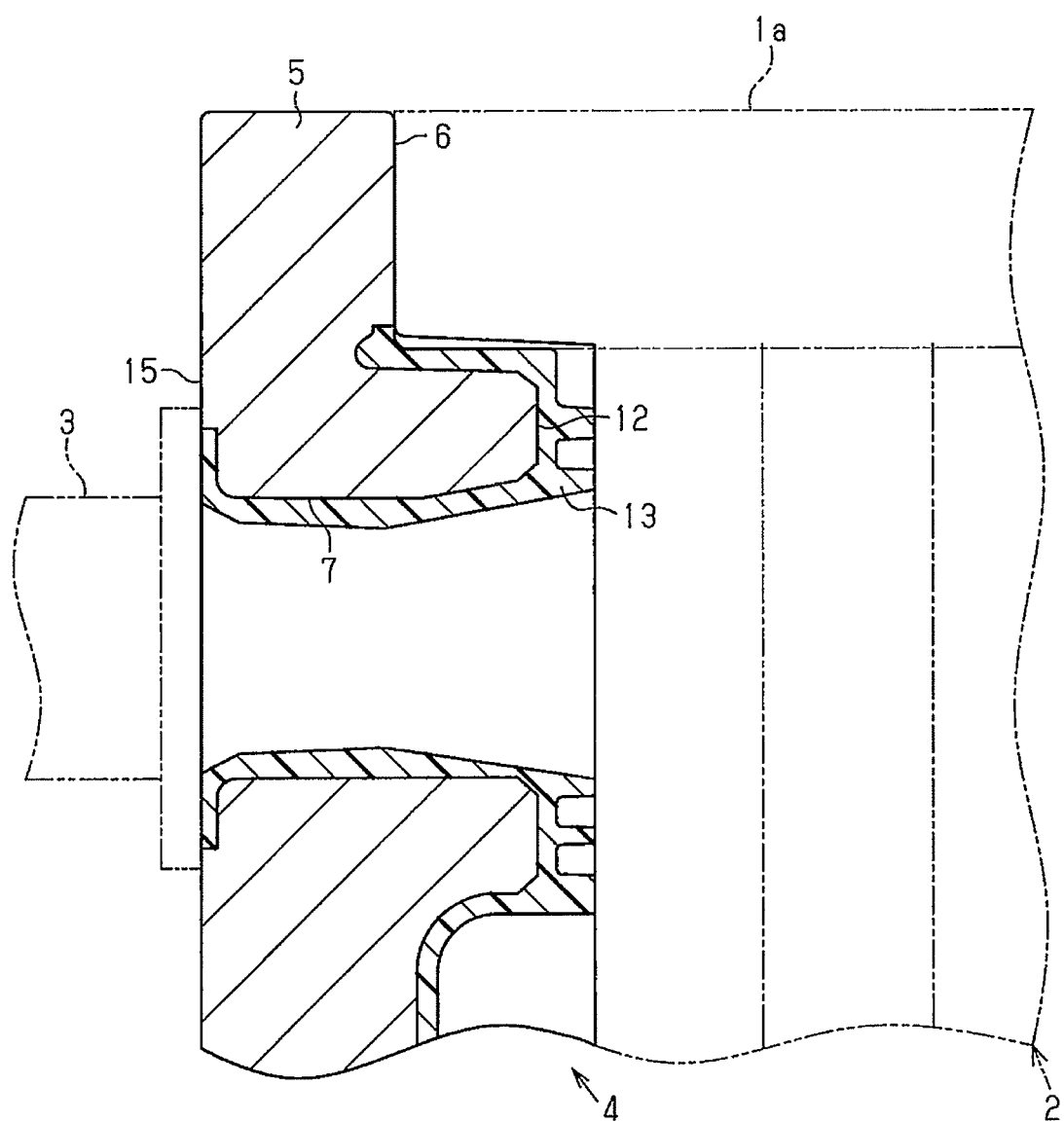
FIG. 3 is a cross-sectional view taken along line A-A in FIG. 2.

As shown in FIG. 3, the end plate 4 includes an opposite surface 15 located at a side opposite to the opposing surface 12 in the thickness-wise direction. The hole 7 opens in the opposite surface 15 of the end plate 4. The resin layer 13 is also formed on the opposite surface 15 around the opening of the hole 7. That is, the resin layer 13 is formed so as to cover the structures around the opening of the hole 7 in the opposite surface 15. The structures around the openings of the holes 8 to 11 (FIG. 2) in the opposite surface 15 of the end plate 4 are the same as the structure around the opening of the hole 7.

When the fastening portion 5 (coupling surface 6) of the end plate 4 is fixed to the case 1a, the passage formed by the hole 7 is connected to the cell stack 2. The passages formed by the holes 8, 10, and 11 (FIG. 2) are also connected to the cell stack 2. Further, an opening of the recess 14 formed in the opposing surface 12 is closed by the end of the cell stack 2 in the cell stacking direction to form a passage through which liquid flows into the recess 14. This passage is also connected to the cell stack 2. A pipe 3 is coupled to the opposite surface 15 of the end plate 4 and connected to the hole 7. Pipes 3 are also coupled to the opposite surface 15 and connected to the holes 8 to 11.

The fastening portion 5 (coupling surface 6) of the end plate 4 is fixed to the case 1a with the opposing surface 12 pressing the cell stack 2 in the cell stacking direction to maintain a satisfactory cell stacking structure of the cell stack 2. In addition, the fluid in the passages formed by the holes 7, 8, 10, and 11 are insulated from the end plate 4 by the resin layer 13. Further, the fluid in the passage formed by the hole 9 and the recess 14 is insulated from the end plate 4 by the resin layer 13. Additionally, the portion of the resin layer 13 between the end plate 4 and the cell stack 2 restricts leakage of the fluids from the passages and insulates the end plate 4 from the cell stack 2. Further, the portions of the resin layer 13 between the end plate 4 and the pipes 3 restrict leakage of fluid from the corresponding passages.

The structure related to the manufacturing of the end plate 4 will now be described.

The end plate 4 is formed through a casting process such as die casting. The casted end plate 4 is held by chucks in the thickness-wise direction. In the held state, the coupling surface 6, the opposing surface 12, and the opposite surface 15 undergo machining (for example, cutting). That is, the coupling surface 6, the opposing surface 12, and the opposite surface 15 correspond to machining subject surfaces of the end plate 4. After the machining subject surfaces of the end plate 4 are machined, insert-molding is performed to form the resin layer 13 covering the opposing surface 12 of the end plate 4, the wall surfaces of the holes 7 to 11, the wall surface of the recess 14, and the portions of the opposite surface 15 located around the openings of the holes 7 to 11.

As shown in FIG. 2, the end plate 4 includes three first holding portions 16 designed to be held by chucks in the thickness-wise direction. Two of the three first holding portions 16 are located where the fastening portion 5 extends along one of the two short sides of the end plate 4. The remaining one of the three first holding portions 16 is located where the fastening portion 5 extends along the other one of the two short sides of the end plate 4. More specifically, two of the first holding portions 16 are located on the fastening portion 5 at two opposite ends of the first short side, which is the left side as viewed in FIG. 2, in the longitudinal direction (vertical direction in FIG. 2) of the first short side. Further, one of the first holding portions 16 is located on the fastening portion 5 at the middle of the second short side, which is the right side as viewed in FIG. 2, in the longitudinal direction of the second short side.

Further, the end plate 4 includes three second holding portions 17 designed to be held by chucks in the thickness-wise direction. The three second holding portions 17 are located at positions separated from the three first holding portions 16. Two of the three second holding portions 17 are located where the fastening portion 5 extends along one of the two short sides of the end plate 4. The remaining one of the three second holding portions 17 is located where the fastening portion 5 extends along the other one of the two short sides of the end plate 4. More specifically, two of the second holding portions 17 are located on the fastening portion 5 at the two opposite ends of the second short side, which is the right side as viewed in FIG. 2, in the longitudinal direction (vertical direction in FIG. 2) of the second short side. Further, one of the second holding portions 17 is located on the fastening portion 5 at the middle of the first short side, which is the left side as viewed in FIG. 2, in the longitudinal direction of the first short side.

The method for manufacturing the end plate 4 will now be described.

Figure 5:
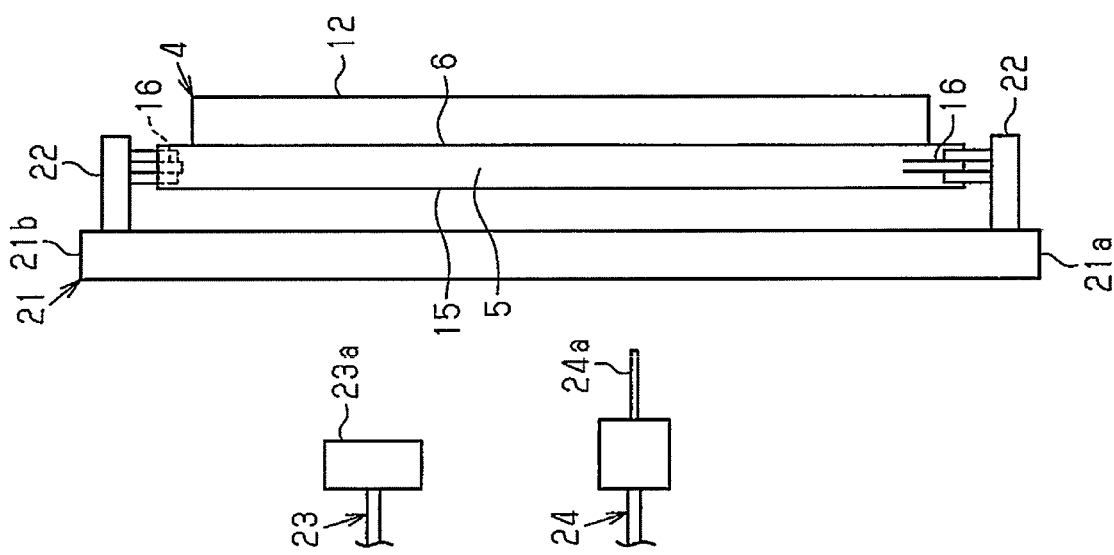
FIG. 5 is a side view showing the frame and rotation tools of the machining device.
Figure 4:
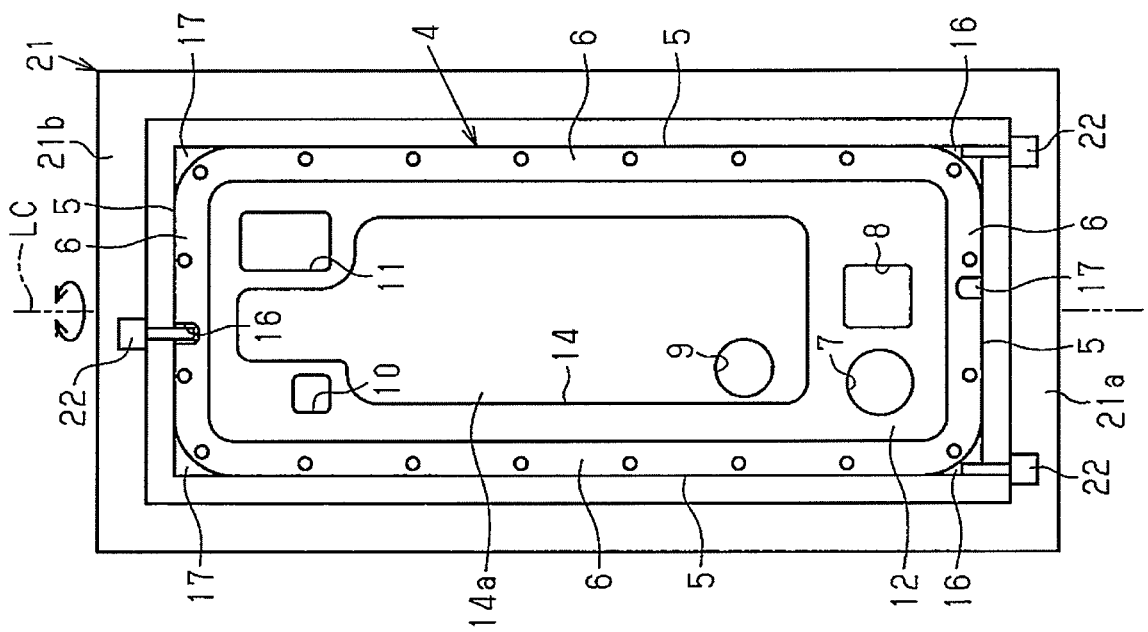
FIG. 4 is a front view showing a frame of a machining device that machines machining subject surfaces of the end plate.

FIGS. 4 and 5 show a machining device that machines the machining subject surfaces of the end plate 4. As shown in FIG. 4, the machining device includes a rectangular frame 21, which is slightly larger than the end plate 4. Two chucks 22 are arranged on a lower side 21a of the frame 21, and one chuck 22 is arranged on an upper side 21b of the frame 21. Further, the frame 21 is configured to rotate about the center line LC extending in the vertical direction.

The casted end plate 4 is arranged on an inner side of the frame 21. The two chucks 22 arranged on the lower side 21a hold the two first holding portions 16 on the first short side of the end plate 4 in the thickness-wise direction. Further, the single chuck 22 arranged on the upper. side 21b holds the single first holding portion 16 arranged on the second short side of the end plate 4 in the thickness-wise direction. In this manner, the chucks 22 hold the end plate 4 to couple the end plate 4 to the frame 21 so that the end plate 4 is integrally rotatable with the frame 21 about the center line LC.

As shown in FIG. 5, rotation tools 23 and 24 that respectively include cutting blades 23a and 24a are arranged beside the frame 21 of the machining device. The rotation tools 23 and 24 are used to machine (cut in this example) the end plate 4. The rotation tool 23 and the rotation tool 24 are used for different purposes such as one for machining a wide surface and one for machining a narrow surface. Alternatively, the rotation tool 23 and the rotation tool 24 are used in accordance with the surface roughness required for the machined surface such as one for a coarse surface and one for a fine surface.

The frame 21 is rotated about the center line LC so that the front surface or the rear surface of the end plate 4, which is located at the inner side of the frame 21, faces the rotation tool 23 or 24. The rotation tools 23 and 24 are rotated and moved relative to the frame 21 to machine a predetermined portion of the end plate 4. The end plate 4 is machined by the rotation tools 23 and 24 in steps (A) to (C) that are described below.

(A) The first holding portions 16 of the end plate 4 are held by the chucks 22 of the frame 21 in the thickness-wise direction. The surface of each second holding portion 17 that is to be held by the corresponding chuck 22 is machined into a predetermined shape. That is, reference surface machining is performed so that the surface of each second holding portion 17 that is to be held by the corresponding chuck 22 becomes a smooth flat surface of which the surface roughness is less than a predetermined value. The reference surface machining may be performed on each second holding portion 17 only on the front side (right side in FIG. 5) of the end plate 4 or on both the front side and the rear side (left side in FIG. 5).

(B) After the reference surface machining is performed, the first holding portions 16 are released from the chucks 22, and the end plate 4 shown in FIG. 4 is reversed upside down. The two chucks 22 arranged on the lower side 21a of the frame 21 are located in correspondence with the two second holding portions 17 arranged on the second short side of the end plate 4. Further, the single chuck 22 arranged on the upper side 21b of the frame 21 is located in correspondence with the single second holding portion 17 arranged on the first short side of the end plate 4. That is, in order to obtain such an arrangement, the positions of each first holding portion 16 and each second holding portion 17 of the end plate 4 and the position of each chuck 22 of the frame 21 are determined in advance. Each second holding portion 17 of the end plate 4, which has been reversed upside down, is held by the corresponding chuck 22 of the frame 21 in the thickness-wise direction.

(C) Machining is performed on the machining subject surfaces, namely, the coupling surface 6, the opposing surface 12, and the opposite surface 15 of the end plate 4 with the second holding portions 17 held by the chucks 22 of the frame 21. Among the machining subject surfaces of the end plate 4, when the coupling surface 6 and the opposing surface 12 are machined, the frame 21 is rotated about the center line LC so that the coupling surface 6 and the opposing surface 12 (front surface of end plate 4) oppose the rotation tools 23 and 24. Among the machining subject surfaces of the end plate 4, when the opposite surface 15 is machined, the frame 21 is rotated about the center line LC so that the opposite surface 15 (rear surface of end plate 4) opposes the rotation tools 23 and 24.

After steps (A) to (C) are performed, the second holding portions 17 of the end plate 4 are released from the chucks 22 to remove the end plate 4 from the frame 21. Then, insert-molding is performed to form the resin layer 13 on the end plate 4, which has been removed from the frame 21. More specifically, insert-molding is performed to form the resin layer 13 that covers the opposing surface 12 of the end plate 4, the wall surfaces of the holes 7 to 11, the wall surface of the recess 14, and the portions in the opposite surface 15 around the openings of the holes 7 to 11.

The method for manufacturing the end plate 4 of the present embodiment has the advantages described below.

(1) Reference surface machining is performed to machine the second holding portions 17 into predetermined shapes in a state in which the first holding portions 16 of the end plate 4 are held by the chucks 22. The machining subject surfaces of the end plate 4 are machined in a state in which the second holding portions 17 that have undergone the reference surface machining are held by the chucks 22. This limits adverse effects on the machining accuracy of the machining subject surfaces and allows the machining subject surfaces of the end plate 4 to be accurately machined.

(2) The coupling surface 6, which is one of the machining subject surfaces of the end plate 4, can be accurately machined. Further, the portions around the openings of the holes 7 to 11 in the opposing surface 12 and the opposite surface 15, which are the machining subject surfaces covered by the resin layer 13, can be accurately machined. Thus, when the coupling surface 6 of the end plate 4 is coupled to the case 1a, the opposing surface 12 can be correctly positioned so that the opposing surface 12 presses the cell stack 2 to maintain a satisfactory cell stacking structure. Further, the portions around the openings of the holes 7 to 11 in the opposite surface 15 are correctly positioned. This correctly connects the pipes 3, which are used to supply and discharge fluid, to the holes 7 to 11 that open in the opposite surface 15.

(3) As described above, the portions around the openings of the holes 7 to 11 in the opposing surface 12 and the opposite surface 15 of the end plate 4 can be accurately machined. Thus, when the resin layer 13 is formed through insert-molding, the portions of the resin layer 13 that cover the portions around the openings of the holes 7 to 11 in the opposing surface 12 and the opposite surface 15 are increased in integrity (accuracy of thickness or the like). The portions of the resin layer 13 covering the portions around the openings of the holes 7, 8, 10, and 11 in the opposing surface 12, the portion around the opening of the recess 14, and the portions around the openings of the holes 7 to 11 in the opposite surface 15 are related to a seal that prevents leakage of fluid supplied to and discharged from the cell stack 2. Thus, an increase in the integrity of these portions of the resin layer 13 improves the sealing properties.

(4) Regardless of whether the chucks 22 hold the first holding portions 16 or the second holding portions 17, the chucks 22 hold one of the two short sides of the end plate 4 at two positions and the other one of the two short sides at one position. The second holding portions 17 of the end plate 4 are machined, and the coupling surface 6, the opposing surface 12, and the opposite surface 15 are machined. During such machining, the chucks 22 correctly hold the end plate 4 at a minimal number of portions.

It should be apparent to those skilled in the art that the present invention may be embodied in many other specific forms without departing from the spirit or scope of the invention. Particularly, it should be understood that the present invention may be embodied in the following forms.

Two first holding portions 16 are arranged on one of the short sides of the end plate 4. Instead, three or more first holding portions 16 may be arranged on the short side. Further, one first holding portion 16 is arranged on the other one of the short sides of the end plate 4. Instead, two or more first holding portions 16 may be arranged on the short side.

Two second holding portions 17 are arranged on one of the short sides of the end plate 4. Instead, three or more second holding portions 17 may be arranged on the short side. Further, one second holding portion 17 is arranged on the other one of the short sides of the end plate 4. Instead, two or more second holding portions 17 may be arranged on the short side.

The first holding portions 16 and the second holding portions 17 may be arranged on the long sides of the end plate 4. In this case, the positions of the chucks 22 of the frame 21 are adjusted in accordance with the positions of the first holding portions 16 and the second holding portions 17.

The above manufacturing method may be applied to a metal plate other than the end plate 4.

The metal plate only needs to include machining subject surfaces on one of a front surface and a rear surface of the metal plate.

Therefore, the present examples and embodiments are to be considered as illustrative and not restrictive and the invention is not to be limited to the details given herein, but may be modified within the scope and equivalence of the appended claims.

The invention claimed is:

1. A method for manufacturing a metal plate, wherein the metal plate includes a machining subject surface in at least one of a front surface and a rear surface of the metal plate in a thickness-wise direction, the machining subject surface is machined in a state in which the metal plate is held by a chuck in the thickness-wise direction, and the metal plate includes a first holding portion designed to be held by the chuck in the thickness-wise direction and a second holding portion located at a position separated from the first holding portion and designed to be held by the chuck in the thickness-wise direction, the method comprising:

performing reference surface machining that machines a surface of the second holding portion that is to be held by the chuck into a predetermined shape in a state in which the first holding portion is held by the chuck;

after performing the reference surface machining, releasing the first holding portion from the chuck and holding the second holding portion with the chuck; and machining the machining subject surface of the metal plate in a state in which the second holding portion is held by the chuck.

2. The method according to claim 1, wherein:

the metal plate is an end plate arranged on an end of a cell stack of a fuel cell in a cell stacking direction by coupling the end plate to a case that surrounds the cell stack;

the machining subject surface is one of a plurality of machining subject surfaces;

the plurality of machining subject surfaces include a coupling surface coupled to the case, an opposing surface that opposes the end of the cell stack in the cell stacking direction when the coupling surface is coupled to the case, and an opposite surface located at a side opposite to the opposing surface in the thickness-wise direction of the end plate when the coupling surface is coupled to the case;

the end plate includes a hole that opens in the opposing surface and the opposite surface to form a passage through which fluid supplied to and discharged from the cell stack flows; and the method further comprises forming a resin layer through insert-molding to cover the opposing surface, a wall surface of the hole, and the opposite surface after machining each of the machining subject surfaces.

3. The method according to claim 2, wherein:

the end plate is rectangular and includes two long sides and two short sides;

the first holding portion is one of a plurality of first holding portions, wherein the plurality of first holding portions include at least two first holding portions arranged on one of the two short sides of the end plate and at least one first holding portion arranged on the other one of the two short sides; and the second holding portion is one of a plurality of second holding portions, wherein the plurality of second holding portions include at least two second holding portions arranged on one of the two short sides of the end plate and at least one second holding portion arranged on the other one of the two short sides.

* * * * *